H. G. POWELL.
COLLAPSIBLE TOP FOR VEHICLES.
APPLICATION FILED OCT. 31, 1917.
1,273,090.
Patented July 16, 1918.
2 SHEETS—SHEET 1.
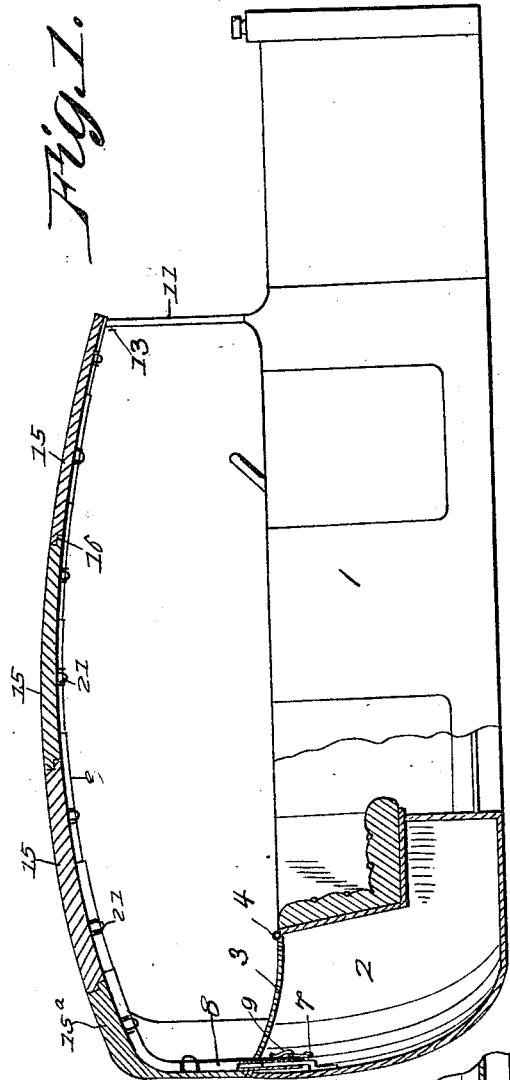
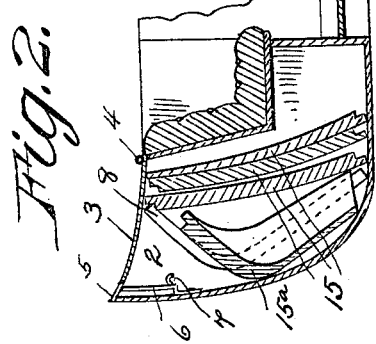
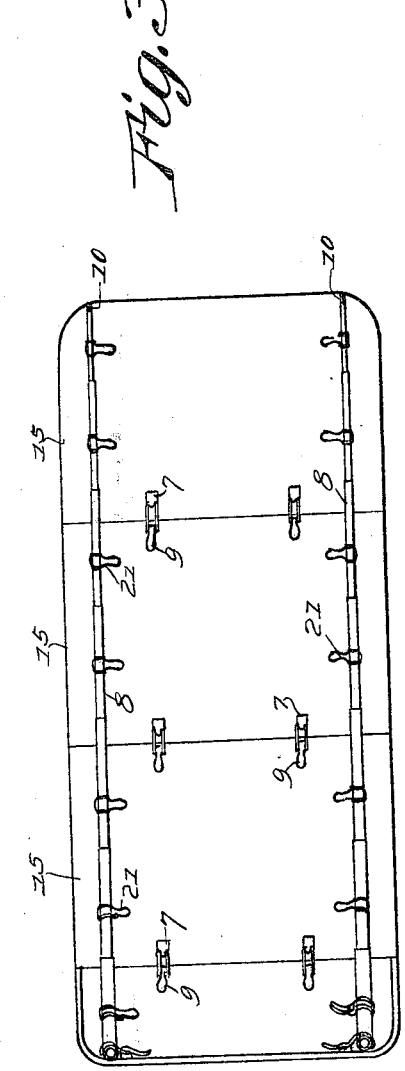
Inventor
Harold G. Powell,
By James J. Sheehy & Co.,
Attorneys

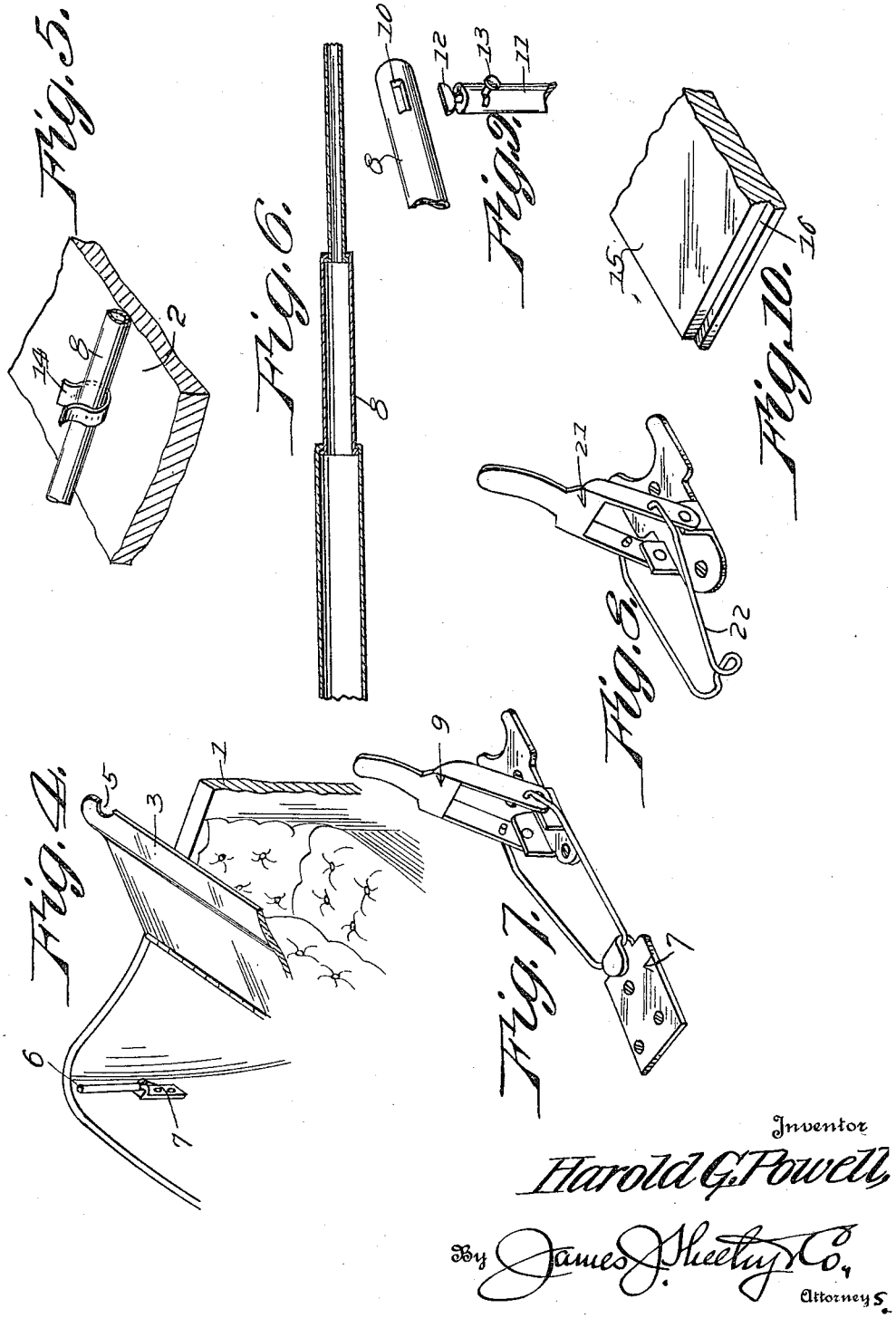

UNITED STATES PATENT OFFICE.

HAROLD G. POWELL, OF OMAHA, NEBRASKA.

COLLAPSIBLE TOP FOR VEHICLES.

1,273,090.   Specification of Letters Patent.   Patented July 16, 1918.

Application filed October 31, 1917. Serial No. 199,458.

*To all whom it may concern:*

Be it known that I, HAROLD G. POWELL, a citizen of the United States, residing at Omaha, in the county of Douglas and State of Nebraska, have invented new and useful Improvements in Collapsible Tops for Vehicles, of which the following is a specification.

My present invention relates to tops for vehicles, more particularly automobiles; and it consists in the peculiar and advantageous collapsible top, hereinafter described and definitely claimed, constructed with a view to being expeditiously and easily taken down and stored in small compass in a compartment provided for its reception in the rear portion of the vehicle and as readily put up and securely fastened in operative position when occasion demands its use.

In the accompanying drawings, which are hereby made a part hereof:

Figure 1 is a view, partly in side elevation and partly in longitudinal vertical section, illustrating an automobile body equipped with my novel collapsible top.

Fig. 2 is a detail longitudinal vertical section showing the manner in which the top sections are stored in the compartment at the rear end of the automobile body.

Fig. 3 is an inverted plan view of the top as it appears when fastened in position for use.

Fig. 4 is a detail perspective showing the cover of the rear compartment in open position.

Fig. 5 is an enlarged detail sectional perspective showing a clip hereinafter specifically referred to.

Fig. 6 is a longitudinal section of one group of telescopic top-supporting tubular sections.

Fig. 7 is an enlarged perspective of one of the locks employed in connecting the top sections to each other.

Fig. 8 is a similar view of one of the locks employed in the connection of the top sections to the telescopic sections.

Fig. 9 comprises disconnected perspectives illustrative of the manner in which the foremost top-supporting sections are detachably connected with the upper edge of the windshield of the automobile.

Fig. 10 is a detail perspective illustrative of the rabbet provided at one transverse edge of some of the top sections and at both transverse edges of the other top sections.

Similar numerals of reference designate corresponding parts in all of the views of the drawings.

The automobile body 1 is peculiar in that it is provided in its rear portion with a storage compartment 2. The said compartment 2 is provided with a cover 3, hinged at 4 and provided in its free edge with notches 5. On the back wall of the compartment 2 are fixed rod sections 6 which extend upwardly to points flush with the upper edges of the compartment walls and are provided with hooks 7, forming members of locks such as shown in Fig. 7, which locks *per se* are not of my invention.

Designed to be arranged over the said rod sections 6, as shown in Fig. 1, are the rear sections 8 of the telescopic top-supporting sections of which there are two groups, one adjacent to each side edge of the top. A portion of one of the said groups is shown in detail in Fig. 6. The said rear sections 8 are equipped with lock members 9 such as shown in Fig. 7, and consequently are adapted to be quickly and securely fastened to the rod sections 6, and this in such manner that disconnection may be readily effected when desirable. When the said top-supporting sections 8 are positioned as shown in Figs. 1 and 3, the foremost sections 8, which are slotted as indicated by 10 and shown in Fig. 9, are detachably connected with the wind shield 11 of the automobile through the medium of turn-buttons 12 carried by the windshield and equipped with finger pieces 13. It will also be understood that the said top-supporting sections 8 are susceptible of ready disconnection from the rod sections 6 and the wind shield 11, and when disconnected are adapted to be stored in the compartment 2, after the manner shown in Fig. 2, at which time said sections 8 may if deemed expedient be attached to the walls of the compartment through the medium of clips 14 such as shown in Fig. 5, this in order to prevent said sections from moving about in the compartment 2 incidental to the motion of the automobile.

Arranged against and upon the telescopic supporting sections 8 are the top sections 15, 15ᵃ; the said top sections being formed of wood or other suitable material, and the rear section 15ª differing in its angular formation from the other sections 15. All of the sections 15, 15ª are provided with rabbeted edges 16, and hence are adapted to be interlocked flush with each other after the manner shown in Fig. 1. The said top sections 15, 15ª are provided on their undersides with lock members 7 and 9 of the type shown in Fig. 7, whereby the contiguous interlocked edges of said sections may be securely though detachably connected together, and the said top sections are also provided on their under or inner sides with lock members 21 of the type shown in Fig. 8. These members 21 have hooks 22 and consequently are adapted to be securely though detachably connected to adjacent top supporting sections 8.

It will be understood from the foregoing that the top sections 15, 15ª are susceptible of being readily disconnected from the supporting sections 8, whereupon said top sections may be stored in the compartment 2, and when deemed expedient brackets may be provided on the side walls of the compartment 2 to which the top sections may be attached by locks such as shown in Fig. 7, the said brackets being equipped with lock members 7, Fig. 7, for the engagement of the complementary members 9 on the top sections. When this provision is resorted to, it will be manifest that movement of the stored top sections in the compartment 2 will be precluded.

It will also be understood from the foregoing that the top-supporting sections 8 and the top sections 15, 15ª may be readily removed from the compartment 2, and expeditiously and easily set up and fastened in operative position as shown in Fig. 1, and that when so set up and detachably fastened the sections 8 and 15, 15ª constitute a rigid and strong top well adapted to withstand the usage to which automobile tops are ordinarily subjected, and one that is neat in appearance and is therefore calculated to enhance the finish of an automobile.

Having described my invention, what I claim and desire to secure by Letters Patent, is:

1. In a vehicle, the combination of a body having a windshield and also having a rear compartment and a cover therefor, said cover having notches in its edge, telescopic top-supporting sections the foremost of which are detachably connected with the windshield and the rearmost of which extend through said notches in the cover, means in the rear compartment for the support of said rearmost top-supporting sections, means for detachably connecting said sections with said supporting means, top sections superimposed on the top-supporting sections and arranged flush with each other and having interlocked edges, means detachably connecting the top sections together, and means detachably connecting the top sections with adjacent top-supporting sections; the said top supporting sections and top sections when disassembled being adapted to be stored in the said compartment.

2. In a vehicle, the combination of a body having a windshield and also having a rear compartment and a cover therefor, said cover having notches in its edge, rod sections fixed in the compartment in alinement with said notches and having their upper ends disposed below the cover, lock members on said rod sections, telescopic top-supporting sections the foremost of which are detachably connected with the windshield and the rearmost of which extend through said notches in the cover and are arranged on said rod sections, lock members on said rearmost sections complementary to the lock members of the rod sections, top sections superimposed on the top-supporting sections and arranged flush with each other and having interlocked edges, lock members arranged on the undersides of said top sections adjacent to the interlocked edges thereof, complementary lock members arranged on the underside of the top sections at the opposite side of said edges, with reference to the first-named members, and adapted to engage the latter, and lock members arranged on the undersides of the top sections and having hooks in detachable engagement with adjacent top-supporting sections; said top-supporting sections and top sections when disassembled being adapted to be stored in the said compartment.

3. In a vehicle, the combination of a body having a windshield, telescopic top-supporting sections the foremost of which are detachably connected with the windshield and the rearmost of which are detachably connected with the rear portion of the body, top sections superimposed on the top-supporting sections and arranged flush with each other and having interlocked edges, means for detachably connecting said top sections together, and means for detachably connecting the top sections with adjacent top-supporting sections.

In testimony whereof I have hereunto set my hand in presence of two subscribing witnesses.

HAROLD G. POWELL.

Witnesses:
  B. M. MAXFIELD,
  L. K. NEWTON.

Copies of this patent may be obtained for five cents each, by addressing the "Commissioner of Patents, Washington, D. C."